(12) United States Patent
Lipton et al.

(10) Patent No.: US 7,932,923 B2
(45) Date of Patent: Apr. 26, 2011

(54) VIDEO SURVEILLANCE SYSTEM EMPLOYING VIDEO PRIMITIVES

(75) Inventors: Alan J. Lipton, Falls Church, VA (US);
Thomas M. Strat, Pakton, VA (US);
Pèter L. Venetianer, McLean, VA (US);
Mark C. Allmen, Morrison, CO (US);
William E. Severson, Littleton, CO (US); Niels Haering, Arlington, VA (US); Andrew J. Chosak, McLean, VA (US); Zhong Zhang, Herndon, VA (US); Matthew F. Frazier, Arlington, VA (US); James S. Seekas, Arlington, VA (US); Tasuki Hirata, Silver Spring, MD (US); John Clark, Leesburg, VA (US)

(73) Assignee: ObjectVideo, Inc., Reston, VA (US)

( * ) Notice: Subject to any disclaimer, the term of this patent is extended or adjusted under 35 U.S.C. 154(b) by 0 days.

(21) Appl. No.: 12/569,116

(22) Filed: Sep. 29, 2009

(65) Prior Publication Data

US 2010/0013926 A1    Jan. 21, 2010

(51) Int. Cl.
*H04N 7/18* (2006.01)
(52) U.S. Cl. ....................................................... 348/143
(58) Field of Classification Search .................. 375/143, 375/144, 145, 148; *H04N 7/18*
See application file for complete search history.

(56) References Cited

U.S. PATENT DOCUMENTS

| | | | |
|---|---|---|---|
| 3,812,287 A | 5/1974 | Lemelson | |
| 4,249,207 A | 2/1981 | Harman et al. | |
| 4,257,063 A | 3/1981 | Loughry et al. | |
| 4,737,847 A | 4/1988 | Araki et al. | |
| 4,908,704 A | 3/1990 | Fujioka et al. | |
| 5,448,315 A | 9/1995 | Soohoo | |
| 5,491,511 A | 2/1996 | Odle | |
| 5,515,453 A | 5/1996 | Hennessey et al. | |
| 5,610,653 A | 3/1997 | Abecassis | |
| 5,623,249 A | 4/1997 | Camire | |
| 5,696,503 A | 12/1997 | Nasburg | |
| 5,801,943 A | 9/1998 | Nasburg | |
| 5,802,361 A | 9/1998 | Wang et al. | |
| 5,850,352 A | 12/1998 | Moezzi et al. | |
| 5,860,086 A | 1/1999 | Crump et al. | |
| 5,872,865 A | 2/1999 | Normile et al. | |
| 5,886,701 A | 3/1999 | Chauvin et al. | |
| 5,912,980 A | 6/1999 | Hunke | |
| 5,926,210 A | 7/1999 | Hackett et al. | |
| 5,956,081 A | 9/1999 | Katz et al. | |
| 5,959,690 A | 9/1999 | Toebes, VIII et al. | |

(Continued)

FOREIGN PATENT DOCUMENTS

EP    0293189 B1    7/1994

(Continued)

OTHER PUBLICATIONS

International Search Report for International Application No. PCT/US08/09073, dated Nov. 3, 2008.

(Continued)

*Primary Examiner* — Tung Vo
(74) *Attorney, Agent, or Firm* — Muir Patent Consulting, PLLC

(57) ABSTRACT

A video surveillance system is set up, calibrated, tasked, and operated. The system extracts video primitives and extracts event occurrences from the video primitives using event discriminators. The system can undertake a response, such as an alarm, based on extracted event occurrences.

41 Claims, 7 Drawing Sheets

U.S. PATENT DOCUMENTS

| | | | |
|---|---|---|---|
| 5,963,202 A | 10/1999 | Polish | |
| 5,963,203 A | 10/1999 | Goldberg et al. | |
| 5,983,147 A | 11/1999 | Krumm | |
| 5,987,211 A | 11/1999 | Abecassis | |
| 5,999,189 A | 12/1999 | Kajiya et al. | |
| 6,014,461 A | 1/2000 | Hennessey et al. | |
| 6,031,573 A | 2/2000 | MacCormack et al. | |
| 6,069,653 A | 5/2000 | Hudson et al. | |
| 6,075,560 A | 6/2000 | Katz | |
| 6,088,484 A | 7/2000 | Mead | |
| 6,091,771 A | 7/2000 | Seeley et al. | |
| 6,097,429 A | 8/2000 | Seeley et al. | |
| 6,123,123 A | 9/2000 | Carder et al. | |
| 6,144,375 A | 11/2000 | Jain et al. | |
| 6,151,413 A | 11/2000 | Jang | |
| 6,166,744 A | 12/2000 | Jaszlics et al. | |
| 6,177,886 B1 | 1/2001 | Billington et al. | |
| 6,025,877 A1 | 2/2001 | Chang et al. | |
| 6,201,473 B1 | 3/2001 | Schaffer | |
| 6,211,907 B1 | 4/2001 | Scaman et al. | |
| 6,226,388 B1 | 5/2001 | Qian et al. | |
| 6,297,844 B1 | 10/2001 | Schatz et al. | |
| 6,307,885 B1 | 10/2001 | Moon et al. | |
| 6,310,916 B1 | 10/2001 | Han | |
| 6,326,964 B1 | 12/2001 | Snyder et al. | |
| 6,351,265 B1 | 2/2002 | Bulman | |
| 6,351,492 B1 | 2/2002 | Kim | |
| 6,360,234 B2 | 3/2002 | Jain et al. | |
| 6,404,455 B1 | 6/2002 | Ito et al. | |
| 6,411,724 B1 | 6/2002 | Vaithilingam et al. | |
| 6,424,370 B1 | 7/2002 | Courtney | |
| 6,504,479 B1 | 1/2003 | Lemons et al. | |
| 6,525,658 B2 | 2/2003 | Streetman et al. | |
| 6,542,075 B2 | 4/2003 | Barker et al. | |
| 6,542,840 B2 | 4/2003 | Okamoto et al. | |
| 6,552,826 B2 | 4/2003 | Adler et al. | |
| 6,570,608 B1 | 5/2003 | Tserng | |
| 6,573,907 B1 | 6/2003 | Madrane | |
| 6,597,800 B1 | 7/2003 | Murray et al. | |
| 6,628,835 B1 | 9/2003 | Brill et al. | |
| 6,646,676 B1 | 11/2003 | DaGraca et al. | |
| 6,696,945 B1 | 2/2004 | Venetianer et al. | |
| 6,707,852 B1 | 3/2004 | Wang | |
| 6,721,454 B1 * | 4/2004 | Qian et al. | 382/224 |
| 6,724,915 B1 | 4/2004 | Toklu et al. | |
| 6,727,938 B1 | 4/2004 | Randall | |
| 6,738,424 B1 | 5/2004 | Allmen et al. | |
| 6,741,977 B1 | 5/2004 | Nagaya | |
| 6,801,662 B1 | 10/2004 | Owechko et al. | |
| 6,812,835 B2 | 11/2004 | Ito et al. | |
| 6,816,184 B1 | 11/2004 | Brill et al. | |
| 6,829,371 B1 | 12/2004 | Nichani et al. | |
| 6,844,818 B2 | 1/2005 | Grech-Cini | |
| 6,865,580 B1 | 3/2005 | Bush | |
| 6,924,801 B1 | 8/2005 | Dorbie | |
| 6,940,998 B2 | 9/2005 | Garoutte | |
| 6,954,498 B1 | 10/2005 | Lipton | |
| 6,987,528 B1 | 1/2006 | Nagahisa | |
| 6,987,883 B2 | 1/2006 | Lipton et al. | |
| 7,023,469 B1 | 4/2006 | Olson | |
| 7,167,519 B2 | 1/2007 | Comaniciu et al. | |
| 7,197,072 B1 | 3/2007 | Hsu et al. | |
| 7,215,795 B2 | 5/2007 | Ito et al. | |
| 7,227,893 B1 | 6/2007 | Srinivasa et al. | |
| 7,301,536 B2 | 11/2007 | Ellenby | |
| 7,307,652 B2 | 12/2007 | Broemmelsiek | |
| 7,356,830 B1 | 4/2008 | Dimitrova | |
| 7,436,887 B2 | 10/2008 | Yeredor et al. | |
| 7,447,331 B2 | 11/2008 | Brown et al. | |
| 7,479,980 B2 | 1/2009 | Merheim et al. | |
| 7,653,635 B1 * | 1/2010 | Paek et al. | 1/1 |
| 7,660,439 B1 | 2/2010 | Lu et al. | |
| 2001/0019357 A1 | 9/2001 | Ito et al. | |
| 2001/0033330 A1 | 10/2001 | Garoutte | |
| 2001/0035907 A1 | 11/2001 | Broemmelsiek | |
| 2002/0008758 A1 | 1/2002 | Broemmelsiek et al. | |
| 2002/0024446 A1 | 2/2002 | Grech-Cini | |
| 2002/0051058 A1 | 5/2002 | Ito et al. | |
| 2002/0082769 A1 | 6/2002 | Church et al. | |
| 2002/0095490 A1 | 7/2002 | Barker et al. | |
| 2002/0135483 A1 | 9/2002 | Merheim et al. | |
| 2002/0163521 A1 | 11/2002 | Ellenby | |
| 2002/0191851 A1 | 12/2002 | Keinan | |
| 2003/0043160 A1 | 3/2003 | Elfving et al. | |
| 2003/0051255 A1 | 3/2003 | Bulman et al. | |
| 2003/0053659 A1 | 3/2003 | Pavlidis et al. | |
| 2003/0085992 A1 | 5/2003 | Arpa et al. | |
| 2003/0231769 A1 | 12/2003 | Bolle et al. | |
| 2004/0113933 A1 | 6/2004 | Guler | |
| 2004/0130620 A1 | 7/2004 | Buehler et al. | |
| 2004/0161133 A1 | 8/2004 | Elazar et al. | |
| 2004/0240542 A1 | 12/2004 | Yeredor et al. | |
| 2005/0146605 A1 | 7/2005 | Lipton et al. | |
| 2005/0157169 A1 | 7/2005 | Brodsky et al. | |
| 2005/0162515 A1 | 7/2005 | Venetianer et al. | |
| 2005/0168574 A1 | 8/2005 | Lipton et al. | |
| 2005/0169367 A1 | 8/2005 | Venetianer et al. | |
| 2005/0198063 A1 | 9/2005 | Thomas et al. | |
| 2006/0232673 A1 | 10/2006 | Lipton et al. | |
| 2006/0279630 A1 | 12/2006 | Aggarwal et al. | |
| 2007/0002141 A1 | 1/2007 | Lipton et al. | |
| 2007/0013776 A1 | 1/2007 | Venetianer et al. | |
| 2007/0052803 A1 | 3/2007 | Chosak et al. | |
| 2007/0127774 A1 | 6/2007 | Zhang et al. | |
| 2008/0100704 A1 | 5/2008 | Venetianer et al. | |

FOREIGN PATENT DOCUMENTS

| | | |
|---|---|---|
| EP | 0893923 A1 | 1/1999 |
| EP | 0967584 A2 | 12/1999 |
| EP | 1024666 A2 | 8/2000 |
| EP | 1120746 | 8/2001 |
| EP | 1333682 A1 | 8/2003 |
| JP | 2009-247654 A | 9/1997 |
| JP | 10-048008 | 2/1998 |
| JP | 10-290449 | 10/1998 |
| JP | 2000-175174 | 6/2000 |
| JP | 2000-339923 | 8/2000 |
| JP | 2000-224542 | 11/2000 |
| JP | 2001-175868 | 6/2001 |
| JP | 2001-285681 | 10/2001 |
| WO | 94/03014 A1 | 2/1994 |
| WO | 01/62005 | 8/2001 |
| WO | WO-03/044727 A1 | 5/2003 |
| WO | WO-2004/006184 A2 | 1/2004 |

OTHER PUBLICATIONS

Written Opinion for International Application No. PCT/US08/09073, dated Nov. 3, 2008.

A. Selinger and L. Wixson, "Classifying Moving Objects as Rigid or Non-Rigid Without Correspondences," Proceedings of DARPA Image Understanding Workshop, 1, Nov. 1998, pp. 341-347.

Alan J. Lipton, Virtual Postman—An Illustrative Example of Virtual Video, International Journal of Robotics and Automation, vol. 15, No. 1, Jan. 2000, pp. 9-16.

Alan J. Lipton, Virtual Postman—Real Time, Interactive Virtual Video, IASTED Conference on Computer Graphics and Imaging (CGIM '99), Palm Springs, Oct. 25-27, 1999.

Robert T. Collins et al., "A System for Video Surveillance and Monitoring," Technical Report CMU-RI-TR-00-12, Robotics Institute, Carnegie Mellon University, May 2000.

Jemez Technology Corp., Variant iD Web-Site, www.variantid.com, printed Aug. 25, 2003.

JP Office Action issued in PCT/US2002/22688 dated Oct. 9, 2007.

A. J. Lipton et al., "Moving Target Classifications and Tracking from Real-time Video," IUW, pp. 159-175, May 1997.

A. J. Lipton, "Local Application of Optic Flow to Analyze Rigid Versus Non-Rigid Motion," International Conference on Computer Vision, Corfu, Greece, Sep. 1999.

A. J. Lipton, H. Fujiyoshi and R. S. Patil, "Moving Target Classification and Tracking for Real-time Video," Proceedings of IEEE WACV'98, Princeton, NJ, 1998, pp. 8-14.

C. R. Wren et al., "Pfinder: Real-time Tracking of the Human Body," PAMI, vol. 19, pp. 780-784, 1997.

C. R. Wren et al., "Pfinder: Real-time Tracking of the Human Body," Vismod, 1995.
CN Office Action for CN 02822772.7 on Oct. 14, 2005.
D. M. Gavrila, "The Visual Analysis of Human Movement: A Survey," CVIU, 73(1):82-98, Jan. 1999.
F. Bartolini et al., "Counting People Getting in and Out of a Bus by Real-time Image-sequence Processing," IVC, 12(1):36-41, Jan. 1994.
H. Fujiyoshi and A. J. Lipton, "Real-time Human Motion Analysis by Image Skeletonization," Proceedings of IEEE WACV'98, Princeton, NJ, 1998, pp. 15-21.
International Search Report for International Application No. PCT/2001/32614 on May 6, 2002.
International Search Report for International Application No. PCT/2006/25196, mailed Jan. 16, 2008.
International Search Report for International Application No. PCT/US06/45625, mailed on Sep. 24, 2007.
International Search Report for International Application No. PCT/US2002/22688 on Dec. 11, 2002.
International Search Report for International Application No. PCT/US2006/012556, mailed on Feb. 12, 2008.
International Search Report for International Application No. PCT/US2006/02700 dated Apr. 13, 2007.
J.P. Deparis et al., "A Device for Counting Passenger Making Use of Two Active Linear Cameras: Comparison of Algorithms," IEEE, pp. 1629-1634, 1996.
L. Khoudour et al., "Real-time Pedestrian Counting by Active Linear Cameras," JEI, 5(4):452-459, Oct. 1996.
L. Wixson et al., "Detecting Salient Motion by Accumulating Directionally-Consistent Flow," IEEE 1999.
L. Wixson et al., "Detecting Salient Motion by Accumulating Directionally-Consistent Flow," IEEE Trans Pattern Anal. Mach. Intell., vol. 22, pp. 774-781, Aug. 2000.
M. Rossi et al., "Tracking and Counting Moving People," ICIP94, pp. 212-216, 1994.
M. Allmen et al., "Long-Range Spatiotemporal Motion Understanding Using Spatiotemporal Flow Curves," Proc. IEEE CVPR, Lahaina, Maui, Hawaii, pp. 303-309, 1991.
M. Isard et al., "BraMBLe: A Bayesian Multiple-Blob Tracker," ICCV, 2001.
N. Haering et al., "Visual Event Detection," Video Computing Series, Editor Mubarak Shah, 2001.
Notification for IL Application No. 161777 issued Feb. 21, 2008.
R .T. Collins, Y. Tsin, J. R. Miller and A. J. Lipton, "Using a DEM to Determine Geospatial Object Trajectories" CMU-RI-TR-98-19, 1998.
S. Ioffe et al., "Probabilistic Methods for Finding People," IJCV, 43(1):45-68, Jun. 2001.
Shio et al., "Segmentation of People in Motion," Proc. IEEE, 1991, vol. 79, pp. 325-332.
T.J. Olsen et al., "Moving Object Detection and Event Recognition Algorithm for Smart Cameras," IUW, pp. 159-175, May 1997.
W.E.L. Grimson et al., "Using Adaptive Tracking to Classify and Monitor Activities in a Site," CVPR, pp. 22-29, Jun. 1998.
Written Opinion for International Application No. PCT/US2006/25196, mailed on Jan. 16, 2008.
Written Opinion issued in PCT Application No. PCT/US2006/012556, mailed on Feb. 12, 2008.
Written Opinion of the International Searching Authority issued for PCT Application No. PCT/US2006/45625, mailed on Sep. 24, 2007.
A. J. Lipton et al., "Moving Target Classifications and Tracking from Real-time Video," IUW, pp. 129-136, 1998.

* cited by examiner

- Person ID 1032:
  - Spent 52s in area
  - Spent 18s at point ◯
- Person ID 1033:
  - Spent 1:08s in area
  - Spent 12s at point ◯
- Object ID 32001:
  - Not a person

VIDEO SURVEILLANCE SYSTEM EMPLOYING VIDEO PRIMITIVES

CROSS-REFERENCE TO RELATED APPLICATIONS

This application claims the priority to U.S. patent application Ser. No. 09/987,707, filed Nov. 15, 2001, which claims priority to U.S. patent application Ser. No. 09/694,712, now U.S. Pat. No. 6,954,498, each of which is incorporated herein by reference in their entirety.

BACKGROUND OF THE INVENTION

Field of the Invention

The invention relates to a system for automatic video surveillance employing video primitives.

REFERENCES

For the convenience of the reader, the references referred to herein are listed below. In the specification, the numerals within brackets refer to respective references. The listed references are incorporated herein by reference.

The following references describe moving target detection:
{1} A. Lipton, H. Fujiyoshi and R. S. Patil, "Moving Target Detection and Classification from Real-Time Video," *Proceedings of IEEE WACV '98*, Princeton, N.J., 1998, pp. 8-14.
{2} W. E. L. Grimson, et al., "Using Adaptive Tracking to Classify and Monitor Activities in a Site", *CVPR*, pp. 22-29, June 1998.
{3} A. J. Lipton, H. Fujiyoshi, R. S. Patil, "Moving Target Classification and Tracking from Real-time Video," *IUW*, pp. 129-136, 1998
{4} T. J. Olson and F. Z. Brill, "Moving Object Detection and Event Recognition Algorithm for Smart Cameras," *IUW*, pp. 159-175, May 1997.

The following references describe detecting and tracking humans:
{5} A. J. Lipton, "Local Application of Optical Flow to Analyse Rigid Versus Non-Rigid Motion," *International Conference on Computer Vision*, Corfu, Greece, September 1999.
{6} F. Bartolini, V. Cappellini, and A. Mecocci, "Counting people getting in and out of a bus by real-time image-sequence processing," *IVC*, 12(1):36-41, January 1994.
{7} M. Rossi and A. Bozzoli, "Tracking and counting moving people," *ICIP94*, pp. 212-216, 1994.
{8} C. R. Wren, A. Azarbayejani, T. Darrell, and A. Pentland, "Pfinder: Real-time tracking of the human body," *Vismod*, 1995.
{9} L. Khoudour, L. Duvieubourg, J. P. Deparis, "Real-Time Pedestrian Counting by Active Linear Cameras," *JEI*, 5(4): 452-459, October 1996.
{10} S. Ioffe, D. A. Forsyth, "Probabilistic Methods for Finding People," *IJCV*, 43(1):45-68, June 2001.
{11} M. Isard and J. MacCormick, "BraMBLe: A Bayesian Multiple-Blob Tracker," *ICCV*, 2001.

The following references describe blob analysis:
{12} D. M. Gavrila, "The Visual Analysis of Human Movement: A Survey," *CVIU*, 73(1):82-98, January 1999.
{13} Niels Haering and Niels da Vitoria Lobo, "Visual Event Detection," *Video Computing Series*, Editor Mubarak Shah, 2001.

The following references describe blob analysis for trucks, cars, and people:
{14} Collins, Lipton, Kanade, Fujiyoshi, Duggins, Tsin, Tolliver, Enomoto, and Hasegawa, "A System for Video Surveillance and Monitoring: VSAM Final Report," Technical Report CMU-RI-TR-00-12, Robotics Institute, Carnegie Mellon University, May 2000.
{15} Lipton, Fujiyoshi, and Patil, "Moving Target Classification and Tracking from Real-time Video," 98 *Darpa IUW*, Nov. 20-23, 1998.

The following reference describes analyzing a single-person blob and its contours:
{16} C. R. Wren, A. Azarbayejani, T. Darrell, and A. P. Pentland. "Pfinder: Real-Time Tracking of the Human Body," *PAMI*, vol 19, pp. 780-784, 1997.

The following reference describes internal motion of blobs, including any motion-based segmentation:
{17} M. Allmen and C. Dyer, "Long-Range Spatiotemporal Motion Understanding Using Spatiotemporal Flow Curves," *Proc. IEEE CVPR*, Lahaina, Maui, Hi., pp. 303-309, 1991.
{18} L. Wixson, "Detecting Salient Motion by Accumulating Directionally Consistent Flow", IEEE Trans. Pattern Anal. Mach. Intell., vol. 22, pp. 774-781, August, 2000.

BACKGROUND OF THE INVENTION

Video surveillance of public spaces has become extremely widespread and accepted by the general public. Unfortunately, conventional video surveillance systems produce such prodigious volumes of data that an intractable problem results in the analysis of video surveillance data.

A need exists to reduce the amount of video surveillance data so analysis of the video surveillance data can be conducted.

A need exists to filter video surveillance data to identify desired portions of the video surveillance data.

SUMMARY OF THE INVENTION

An object of the invention is to reduce the amount of video surveillance data so analysis of the video surveillance data can be conducted.

An object of the invention is to filter video surveillance data to identify desired portions of the video surveillance data.

An object of the invention is to produce a real time alarm based on an automatic detection of an event from video surveillance data.

An object of the invention is to integrate data from surveillance sensors other than video for improved searching capabilities.

An object of the invention is to integrate data from surveillance sensors other than video for improved event detection capabilities The invention includes an article of manufacture, a method, a system, and an apparatus for video surveillance.

The article of manufacture of the invention includes a computer-readable medium comprising software for a video surveillance system, comprising code segments for operating the video surveillance system based on video primitives.

The article of manufacture of the invention includes a computer-readable medium comprising software for a video surveillance system, comprising code segments for accessing archived video primitives, and code segments for extracting event occurrences from accessed archived video primitives.

The system of the invention includes a computer system including a computer-readable medium having software to operate a computer in accordance with the invention.

The apparatus of the invention includes a computer including a computer-readable medium having software to operate the computer in accordance with the invention.

The article of manufacture of the invention includes a computer-readable medium having software to operate a computer in accordance with the invention.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DEFINITIONS

A "video" refers to motion pictures represented in analog and/or digital form. Examples of video include: television; movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

An "activity" refers to one or more actions and/or one or more composites of actions of one or more objects. Examples of an activity include: entering; exiting; stopping; moving; raising; lowering; growing; and shrinking.

A "location" refers to a space where an activity may occur. A location can be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" refers to one or more objects engaged in an activity. The event may be referenced with respect to a location and/or a time.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
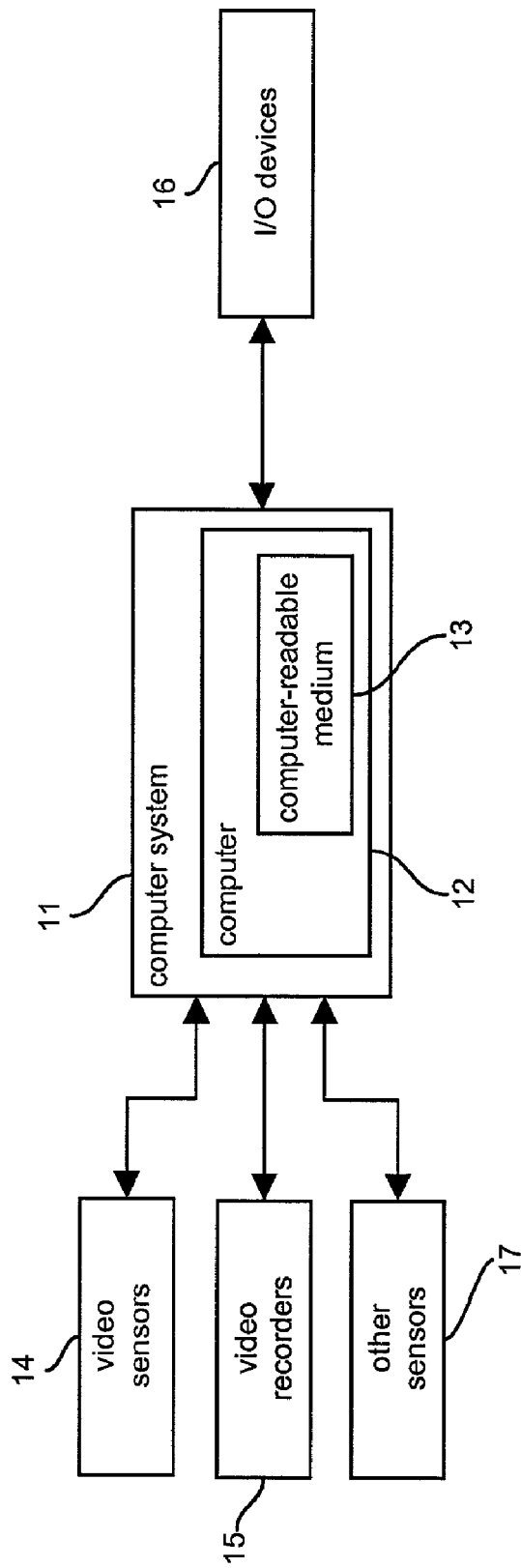
FIG. 1 illustrates a plan view of the video surveillance system of the invention.

The automatic video surveillance system of the invention is for monitoring a location for, for example, market research or security purposes. The system can be a dedicated video surveillance installation with purpose-built surveillance components, or the system can be a retrofit to existing video surveillance equipment that piggybacks off the surveillance video feeds. The system is capable of analyzing video data from live sources or from recorded media. The system can have a prescribed response to the analysis, such as record data, activate an alarm mechanism, or active another sensor system. The system is also capable of integrating with other surveillance system components. The system produces security or market research reports that can be tailored according to the needs of an operator and, as an option, can be presented through an interactive web-based interface, or other reporting mechanism.

An operator is provided with maximum flexibility in configuring the system by using event discriminators. Event discriminators are identified with one or more objects (whose descriptions are based on video primitives), along with one or more optional spatial attributes, and/or one or more optional temporal attributes. For example, an operator can define an event discriminator (called a "loitering" event in this example) as a "person" object in the "automatic teller machine" space for "longer than 15 minutes" and "between 10:00 p.m. and 6:00 a.m."

Although the video surveillance system of the invention draws on well-known computer vision techniques from the public domain, the inventive video surveillance system has several unique and novel features that are not currently available. For example, current video surveillance systems use large volumes of video imagery as the primary commodity of information interchange. The system of the invention uses video primitives as the primary commodity with representative video imagery being used as collateral evidence. The system of the invention can also be calibrated (manually, semi-automatically, or automatically) and thereafter automatically can infer video primitives from video imagery. The system can further analyze previously processed video without needing to reprocess completely the video. By analyzing previously processed video, the system can perform inference analysis based on previously recorded video primitives, which greatly improves the analysis speed of the computer system.

As another example, the system of the invention provides unique system tasking. Using equipment control directives, current video systems allow a user to position video sensors and, in some sophisticated conventional systems, to mask out regions of interest or disinterest. Equipment control directives are instructions to control the position, orientation, and focus of video cameras. Instead of equipment control directives, the system of the invention uses event discriminators based on video primitives as the primary tasking mechanism. With event discriminators and video primitives, an operator is provided with a much more intuitive approach over conventional systems for extracting useful information from the system. Rather than tasking a system with an equipment control directives, such as "camera A pan 45 degrees to the left," the system of the invention can be tasked in a human-intuitive manner with one or more event discriminators based on video primitives, such as "a person enters restricted area A."

Using the invention for market research, the following are examples of the type of video surveillance that can be performed with the invention: counting people in a store; counting people in a part of a store; counting people who stop in a particular place in a store; measuring how long people spend in a store; measuring how long people spend in a part of a store; and measuring the length of a line in a store.

Using the invention for security, the following are examples of the type of video surveillance that can be performed with the invention: determining when anyone enters a restricted area and storing associated imagery; determining when a person enters an area at unusual times; determining when changes to shelf space and storage space occur that might be unauthorized; determining when passengers aboard an aircraft approach the cockpit; determining when people tailgate through a secure portal; determining if there is an unattended bag in an airport; and determining if there is a theft of an asset.

FIG. 1 illustrates a plan view of the video surveillance system of the invention. A computer system 11 comprises a computer 12 having a computer-readable medium 13 embodying software to operate the computer 12 according to the invention. The computer system 11 is coupled to one or more video sensors 14, one or more video recorders 15, and one or more input/output (I/O) devices 16. The video sensors 14 can also be optionally coupled to the video recorders 15 for direct recording of video surveillance data. The computer system is optionally coupled to other sensors 17.

The video sensors 14 provide source video to the computer system 11. Each video sensor 14 can be coupled to the computer system 11 using, for example, a direct connection (e.g., a firewire digital camera interface) or a network. The video sensors 14 can exist prior to installation of the invention or can be installed as part of the invention. Examples of a video sensor 14 include: a video camera; a digital video camera; a color camera; a monochrome camera; a camera; a camcorder, a PC camera; a webcam; an infra-red video camera; and a CCTV camera.

The video recorders 15 receive video surveillance data from the computer system 11 for recording and/or provide source video to the computer system 11. Each video recorder 15 can be coupled to the computer system 11 using, for example, a direct connection or a network. The video recorders 15 can exist prior to installation of the invention or can be installed as part of the invention. Examples of a video recorder 15 include: a video tape recorder; a digital video recorder; a video disk; a DVD; and a computer-readable medium.

The I/O devices 16 provide input to and receive output from the computer system 11. The I/O devices 16 can be used to task the computer system 11 and produce reports from the computer system 11. Examples of I/O devices 16 include: a keyboard; a mouse; a stylus; a monitor; a printer; another computer system; a network; and an alarm.

The other sensors 17 provide additional input to the computer system 11. Each other sensor 17 can be coupled to the computer system 11 using, for example, a direct connection or a network. The other sensors 17 can exit prior to installation of the invention or can be installed as part of the invention. Examples of another sensor 17 include: a motion sensor; an optical tripwire; a biometric sensor; and a card-based or keypad-based authorization system. The outputs of the other sensors 17 can be recorded by the computer system 11, recording devices, and/or recording systems.

Figure 2:
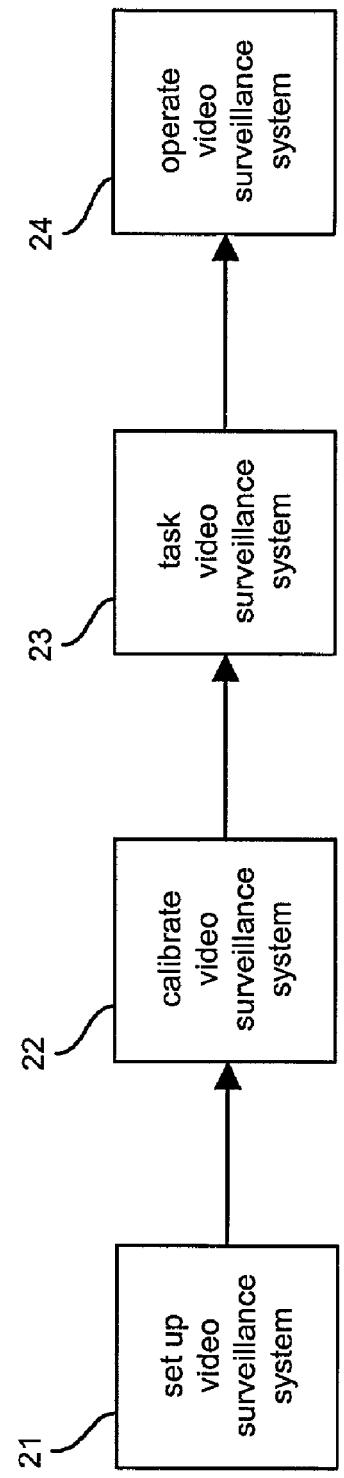
FIG. 2 illustrates a flow diagram for the video surveillance system of the invention.

FIG. 2 illustrates a flow diagram for the video surveillance system of the invention. Various aspects of the invention are exemplified with reference to FIGS. 10-15, which illustrate examples of the video surveillance system of the invention applied to monitoring a grocery store.

In block 21, the video surveillance system is set up as discussed for FIG. 1. Each video sensor 14 is orientated to a location for video surveillance. The computer system 11 is connected to the video feeds from the video equipment 14 and 15. The video surveillance system can be implemented using existing equipment or newly installed equipment for the location.

In block 22, the video surveillance system is calibrated. Once the video surveillance system is in place from block 21, calibration occurs. The result of block 22 is the ability of the video surveillance system to determine an approximate absolute size and speed of a particular object (e.g., a person) at various places in the video image provided by the video sensor. The system can be calibrated using manual calibration, semi-automatic calibration, and automatic calibration. Calibration is further described after the discussion of block 24.

In block 23 of FIG. 2, the video surveillance system is tasked. Tasking occurs after calibration in block 22 and is optional. Tasking the video surveillance system involves specifying one or more event discriminators. Without tasking, the video surveillance system operates by detecting and archiving video primitives and associated video imagery without taking any action, as in block 45 in FIG. 4.

Figure 3:
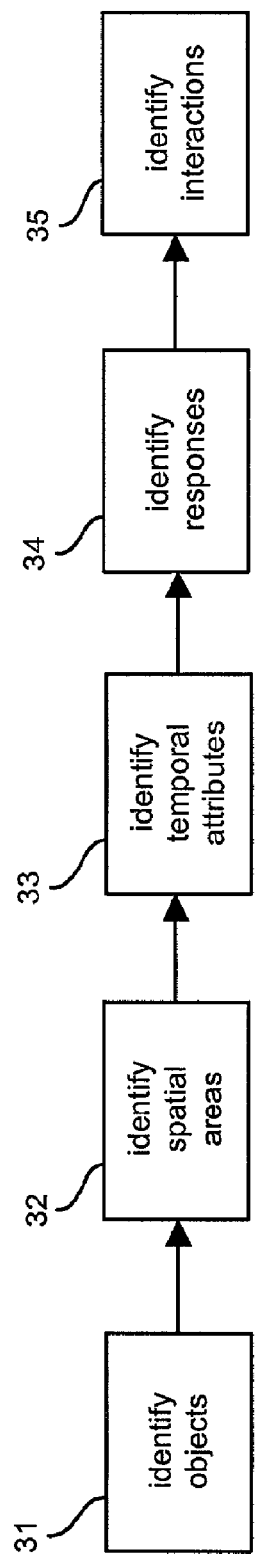
FIG. 3 illustrates a flow diagram for tasking the video surveillance system.

FIG. 3 illustrates a flow diagram for tasking the video surveillance system to determine event discriminators. An event discriminator refers to one or more objects optionally interacting with one or more spatial attributes and/or one or more temporal attributes. An event discriminator is described in terms of video primitives. A video primitive refers to an observable attribute of an object viewed in a video feed. Examples of video primitives include the following: a classification; a size; a shape; a color; a texture; a position; a velocity; a speed; an internal motion; a motion; a salient motion; a feature of a salient motion; a scene change; a feature of a scene change; and a pre-defined model.

A classification refers to an identification of an object as belonging to a particular category or class. Examples of a classification include: a person; a dog; a vehicle; a police car; an individual person; and a specific type of object.

A size refers to a dimensional attribute of an object. Examples of a size include: large; medium; small; flat; taller than 6 feet; shorter than 1 foot; wider than 3 feet; thinner than 4 feet; about human size; bigger than a human; smaller than a human; about the size of a car; a rectangle in an image with approximate dimensions in pixels; and a number of image pixels.

A color refers to a chromatic attribute of an object. Examples of a color include: white; black; grey; red; a range of HSV values; a range of YUV values; a range of RGB values; an average RGB value; an average YUV value; and a histogram of RGB values.

A texture refers to a pattern attribute of an object. Examples of texture features include: self-similarity; spectral power; linearity; and coarseness.

An internal motion refers to a measure of the rigidity of an object. An example of a fairly rigid object is a car, which does not exhibit a great amount of internal motion. An example of a fairly non-rigid object is a person having swinging arms and legs, which exhibits a great amount of internal motion.

A motion refers to any motion that can be automatically detected. Examples of a motion include: appearance of an object; disappearance of an object; a vertical movement of an object; a horizontal movement of an object; and a periodic movement of an object.

A salient motion refers to any motion that can be automatically detected and can be tracked for some period of time. Such a moving object exhibits apparently purposeful motion. Examples of a salient motion include: moving from one place to another; and moving to interact with another object.

A feature of a salient motion refers to a property of a salient motion. Examples of a feature of a salient motion include: a trajectory; a length of a trajectory in image space; an approximate length of a trajectory in a three-dimensional representation of the environment; a position of an object in image space as a function of time; an approximate position of an object in a three-dimensional representation of the environment as a function of time; a duration of a trajectory; a velocity (e.g., speed and direction) in image space; an approximate velocity (e.g., speed and direction) in a three-dimensional representation of the environment; a duration of time at a velocity; a change of velocity in image space; an approximate change of velocity in a three-dimensional representation of the environment; a duration of a change of velocity; cessation of motion; and a duration of cessation of motion. A velocity refers to the speed and direction of an object at a particular time. A trajectory refers a set of (position, velocity) pairs for an object for as long as the object can be tracked or for a time period.

A scene change refers to any region of a scene that can be detected as changing over a period of time. Examples of a scene change include: an stationary object leaving a scene; an object entering a scene and becoming stationary; an object changing position in a scene; and an object changing appearance (e.g. color, shape, or size).

A feature of a scene change refers to a property of a scene change. Examples of a feature of a scene change include: a size of a scene change in image space; an approximate size of a scene change in a three-dimensional representation of the environment; a time at which a scene change occurred; a location of a scene change in image space; and an approximate location of a scene change in a three-dimensional representation of the environment.

A pre-defined model refers to an a priori known model of an object. Examples of a pre-defined include: an adult; a child; a vehicle; and a semi-trailer.

In block 31, one or more objects types of interests are identified in terms of video primitives or abstractions thereof. Examples of one or more objects include: an object; a person; a red object; two objects; two persons; and a vehicle.

In block 32, one or more spatial areas of interest are identified. An area refers to one or more portions of an image from a source video or a spatial portion of a scene being viewed by a video sensor. An area also includes a combination of areas from various scenes and/or images. An area can be an image-based space (e.g., a line, a rectangle, a polygon, or a circle in a video image) or a three-dimensional space (e.g., a cube, or an area of floor space in a building).

Figure 12:
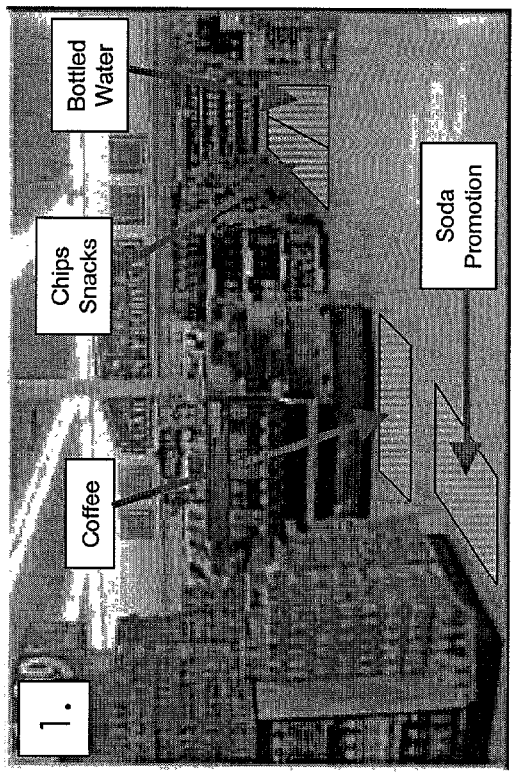

FIG. 12 illustrates identifying areas along an aisle in a grocery store. Four areas are identified: coffee; soda promotion; chips snacks; and bottled water. The areas are identified via a point-and-click interface with the system.

In block 33, one or more temporal attributes of interest are optionally identified. Examples of a temporal attribute include: every 15 minutes; between 9:00 p.m. to 6:30 a.m.; less than 5 minutes; longer than 30 seconds; over the weekend; and within 20 minutes of.

In block 34, a response is optionally identified. Examples of a response includes the following: activating a visual and/or audio alert on a system display; activating a visual and/or audio alarm system at the location; activating a silent alarm; activating a rapid response mechanism; locking a door; contacting a security service; forwarding data (e.g., image data, video data, video primitives; and/or analyzed data) to another computer system via a network, such as the Internet; saving such data to a designated computer-readable medium; activating some other sensor or surveillance system; tasking the computer system 11 and/or another computer system; and directing the computer system 11 and/or another computer system.

In block 35, one or more discriminators are identified by describing interactions between video primitives (or their abstractions), spatial areas of interest, and temporal attributes of interest. An interaction is determined for a combination of one or more objects identified in block 31, one or more spatial areas of interest identified in block 32, and one or more temporal attributes of interest identified in block 33. One or more responses identified in block 34 are optionally associated with each event discriminator.

Examples of an event discriminator for a single object include: an object appears; a person appears; and a red object moves faster than 10 m/s.

Examples of an event discriminator for multiple objects include: two objects come together; a person exits a vehicle; and a red object moves next to a blue object.

Examples of an event discriminator for an object and a spatial attribute include: an object crosses a line; an object enters an area; and a person crosses a line from the left.

Examples of an event discriminator for an object and a temporal attribute include: an object appears at 10:00 p.m.; a person travels faster then 2 m/s between 9:00 a.m. and 5:00 p.m.; and a vehicle appears on the weekend.

Examples of an event discriminator for an object, a spatial attribute, and a temporal attribute include: a person crosses a line between midnight and 6:00 a.m.; and a vehicle stops in an area for longer than 10 minutes.

An example of an event discriminator for an object, a spatial attribute, and a temporal attribute associated with a response include: a person enters an area between midnight and 6:00 a.m., and a security service is notified.

Figure 4:
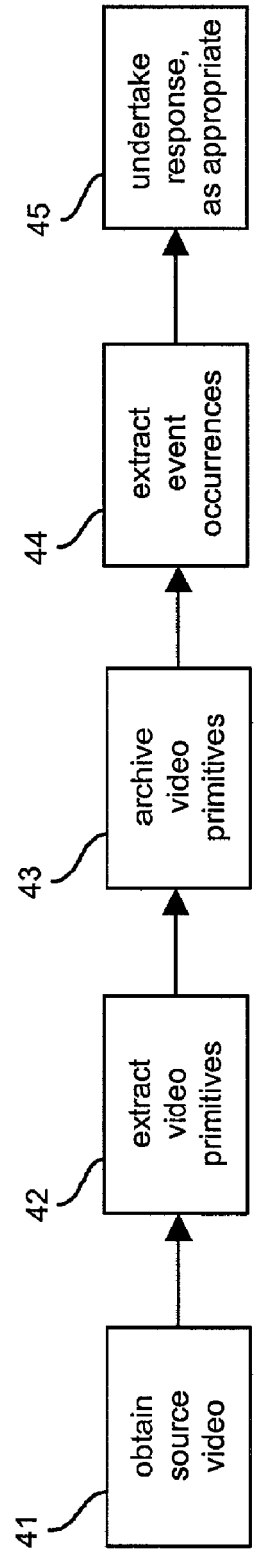
FIG. 4 illustrates a flow diagram for operating the video surveillance system.

In block 24 of FIG. 2, the video surveillance system is operated. The video surveillance system of the invention operates automatically, detects and archives video primitives of objects in the scene, and detects event occurrences in real time using event discriminators. In addition, action is taken in real time, as appropriate, such as activating alarms, generating reports, and generating output. The reports and output can be displayed and/or stored locally to the system or elsewhere via a network, such as the Internet. FIG. 4 illustrates a flow diagram for operating the video surveillance system.

In block 41, the computer system 11 obtains source video from the video sensors 14 and/or the video recorders 15.

In block 42, video primitives are extracted in real time from the source video. As an option, non-video primitives can be obtained and/or extracted from one or more other sensors 17 and used with the invention. The extraction of video primitives is illustrated with FIG. 5.

Figure 5:
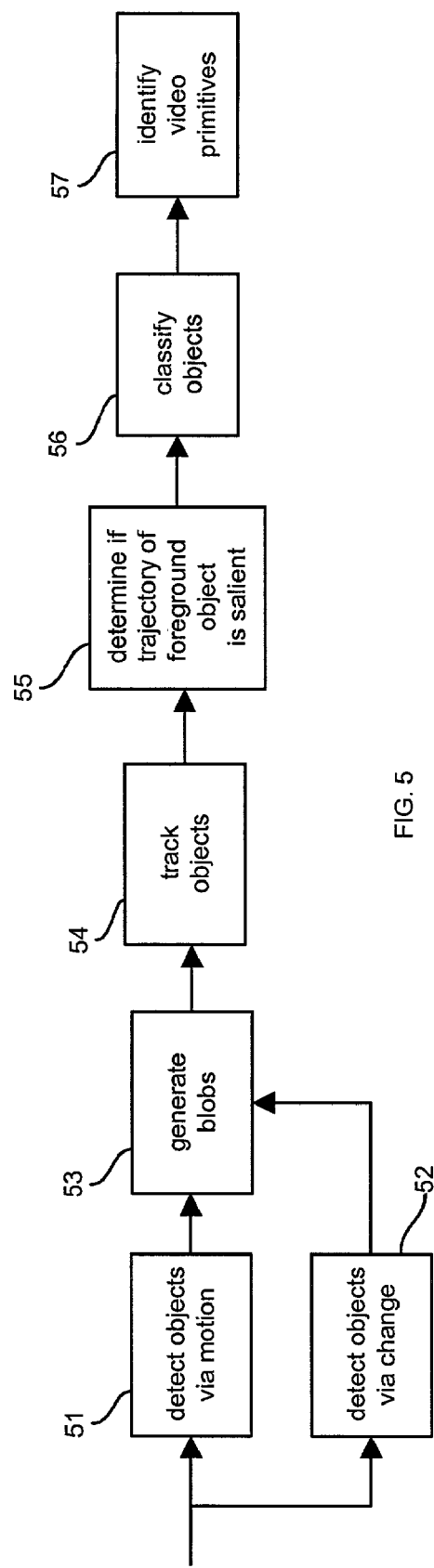
FIG. 5 illustrates a flow diagram for extracting video primitives for the video surveillance system.

FIG. 5 illustrates a flow diagram for extracting video primitives for the video surveillance system. Blocks 51 and 52 operate in parallel and can be performed in any order or concurrently. In block 51, objects are detected via movement. Any motion detection algorithm for detecting movement between frames at the pixel level can be used for this block. As an example, the three frame differencing technique can be used, which is discussed in {1}. The detected objects are forwarded to block 53.

In block 52, objects are detected via change. Any change detection algorithm for detecting changes from a background model can be used for this block. An object is detected in this block if one or more pixels in a frame are deemed to be in the foreground of the frame because the pixels do not conform to a background model of the frame. As an example, a stochastic background modeling technique, such as dynamically adaptive background subtraction, can be used, which is described in {1} and U.S. patent application Ser. No. 09/694,712 filed Oct. 24, 2000. The detected objects are forwarded to block 53.

The motion detection technique of block 51 and the change detection technique of block 52 are complimentary techniques, where each technique advantageously addresses deficiencies in the other technique. As an option, additional and/or alternative detection schemes can be used for the techniques discussed for blocks 51 and 52. Examples of an additional and/or alternative detection scheme include the following: the Pfinder detection scheme for finding people as described in {8}; a skin tone detection scheme; a face detection scheme; and a model-based detection scheme. The results of such additional and/or alternative detection schemes are provided to block 53.

As an option, if the video sensor 14 has motion (e.g., a video camera that sweeps, zooms, and/or translates), an additional block can be inserted before blocks between blocks 51 and 52 to provide input to blocks 51 and 52 for video stabilization. Video stabilization can be achieved by affine or projective global motion compensation. For example, image alignment described in U.S. patent application Ser. No. 09/609,919, filed Jul. 3, 2000, which is incorporated herein by reference, can be used to obtain video stabilization.

In block 53, blobs are generated. In general, a blob is any object in a frame. Examples of a blob include: a moving object, such as a person or a vehicle; and a consumer product, such as a piece of furniture, a clothing item, or a retail shelf item. Blobs are generated using the detected objects from blocks 32 and 33. Any technique for generating blobs can be used for this block. An exemplary technique for generating blobs from motion detection and change detection uses a connected components scheme. For example, the morphology and connected components algorithm can be used, which is described in {1}.

In block 54, blobs are tracked. Any technique for tracking blobs can be used for this block. For example, Kalman filtering or the CONDENSATION algorithm can be used. As another example, a template matching technique, such as described in {1}, can be used. As a further example, a multi-hypothesis Kalman tracker can be used, which is described in {5}. As yet another example, the frame-to-frame tracking technique described in U.S. patent application Ser. No. 09/694,712 filed Oct. 24, 2000, can be used. For the example of a location being a grocery store, examples of objects that can be tracked include moving people, inventory items, and inventory moving appliances, such as shopping carts or trolleys.

As an option, blocks 51-54 can be replaced with any detection and tracking scheme, as is known to those of ordinary skill. An example of such a detection and tracking scheme is described in {11}.

In block 55, each trajectory of the tracked objects is analyzed to determine if the trajectory is salient. If the trajectory is insalient, the trajectory represents an object exhibiting unstable motion or represents an object of unstable size or color, and the corresponding object is rejected and is no longer analyzed by the system. If the trajectory is salient, the trajectory represents an object that is potentially of interest. A trajectory is determined to be salient or insalient by applying a salience measure to the trajectory. Techniques for determining a trajectory to be salient or insalient are described in {13} and {18}.

In block 56, each object is classified. The general type of each object is determined as the classification of the object. Classification can be performed by a number of techniques, and examples of such techniques include using a neural network classifier {14} and using a linear discriminatant classifier {14}. Examples of classification are the same as those discussed for block 23.

In block 57, video primitives are identified using the information from blocks 51-56 and additional processing as necessary. Examples of video primitives identified are the same as those discussed for block 23. As an example, for size, the system can use information obtained from calibration in block 22 as a video primitive. From calibration, the system has sufficient information to determine the approximate size of an object. As another example, the system can use velocity as measured from block 54 as a video primitive.

In block 43, the video primitives from block 42 are archived. The video primitives can be archived in the computer-readable medium 13 or another computer-readable medium. Along with the video primitives, associated frames or video imagery from the source video can be archived.

In block 44, event occurrences are extracted from the video primitives using event discriminators. The video primitives are determined in block 42, and the event discriminators are determined from tasking the system in block 23. The event discriminators are used to filter the video primitives to determine if any event occurrences occurred. For example, an event discriminator can be looking for a "wrong way" event as defined by a person traveling the "wrong way" into an area between 9:00 a.m. and 5:00 p.m. The event discriminator checks all video primitives being generated according to FIG. 5 and determines if any video primitives exist which have the following properties: a timestamp between 9:00 a.m. and 5:00 p.m., a classification of "person" or "group of people", a position inside the area, and a "wrong" direction of motion.

Figure 6:
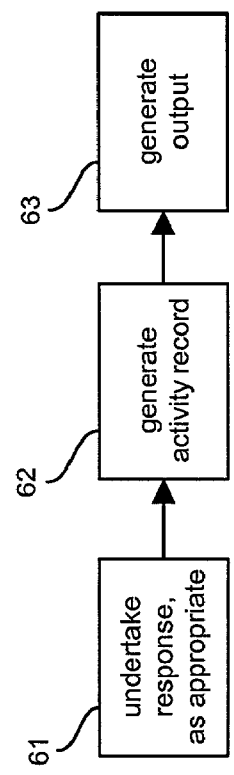
FIG. 6 illustrates a flow diagram for taking action with the video surveillance system.

In block 45, action is taken for each event occurrence extracted in block 44, as appropriate. FIG. 6 illustrates a flow diagram for taking action with the video surveillance system.

In block 61, responses are undertaken as dictated by the event discriminators that detected the event occurrences. The response, if any, are identified for each event discriminator in block 34.

In block 62, an activity record is generated for each event occurrence that occurred. The activity record includes, for example: details of a trajectory of an object; a time of detection of an object; a position of detection of an object, and a description or definition of the event discriminator that was employed. The activity record can include information, such as video primitives, needed by the event discriminator. The activity record can also include representative video or still imagery of the object(s) and/or area(s) involved in the event occurrence. The activity record is stored on a computer-readable medium.

In block 63, output is generated. The output is based on the event occurrences extracted in block 44 and a direct feed of the source video from block 41. The output is stored on a computer-readable medium, displayed on the computer system 11 or another computer system, or forwarded to another computer system. As the system operates, information regarding event occurrences is collected, and the information can be viewed by the operator at any time, including real time. Examples of formats for receiving the information include: a display on a monitor of a computer system; a hard copy; a computer-readable medium; and an interactive web page.

The output can include a display from the direct feed of the source video from block 41. For example, the source video can be displayed on a window of the monitor of a computer system or on a closed-circuit monitor. Further, the output can include source video marked up with graphics to highlight the objects and/or areas involved in the event occurrence.

The output can include one or more reports for an operator based on the requirements of the operator and/or the event occurrences. Examples of a report include: the number of event occurrences which occurred; the positions in the scene in which the event occurrence occurred; the times at which the event occurrences occurred; representative imagery of each event occurrence; representative video of each event occurrence; raw statistical data; statistics of event occurrences (e.g., how many, how often, where, and when); and/or human-readable graphical displays.

Figure 14:
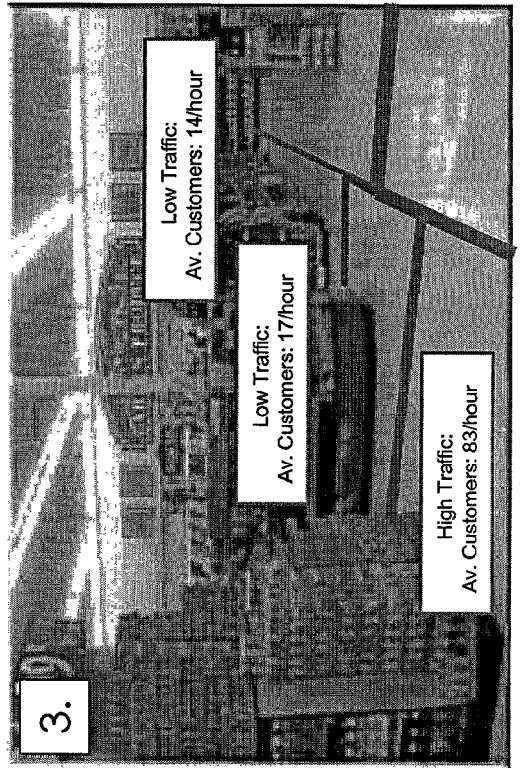
Figure 13:
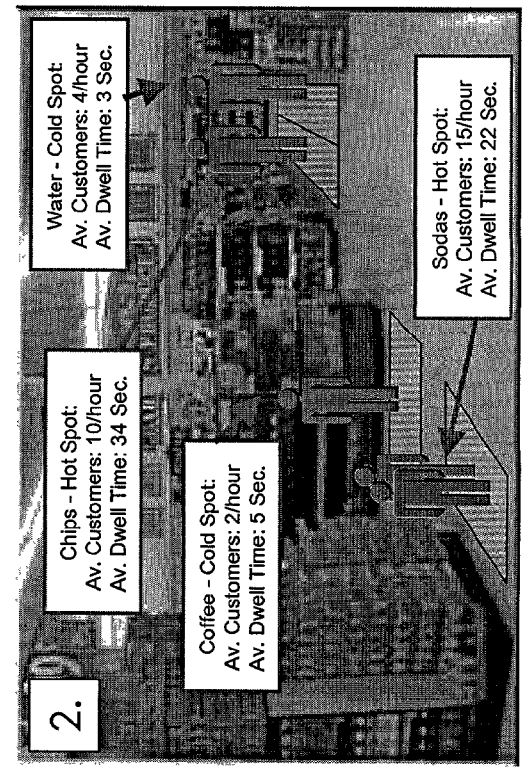
Figure 15:
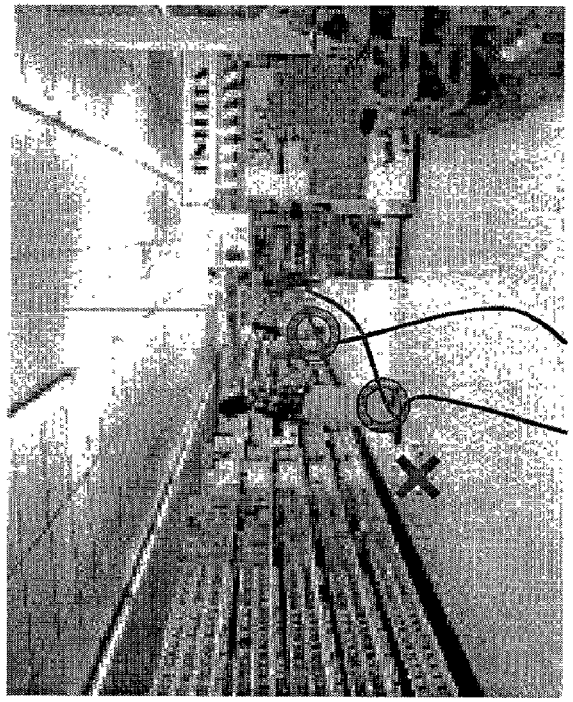

FIGS. 13 and 14 illustrate an exemplary report for the aisle in the grocery store of FIG. 15. In FIGS. 13 and 14, several areas are identified in block 22 and are labeled accordingly in the images. The areas in FIG. 13 match those in FIG. 12, and the areas in FIG. 14 are different ones. The system is tasked to look for people who stop in the area.

In FIG. 13, the exemplary report is an image from a video marked-up to include labels, graphics, statistical information, and an analysis of the statistical information. For example, the area identified as coffee has statistical information of an average number of customers in the area of 2/hour and an average dwell time in the area as 5 seconds. The system determined this area to be a "cold" region, which means there is not much commercial activity through this region. As another example, the area identified as sodas has statistical information of an average number of customers in the area of 15/hour and an average dwell time in the area as 22 seconds. The system determined this area to be a "hot" region, which means there is a large amount of commercial activity in this region.

In FIG. 14, the exemplary report is an image from a video marked-up to include labels, graphics, statistical information, and an analysis of the statistical information. For example, the area at the back of the aisle has average number of customers of 14/hour and is determined to have low traffic. As another example, the area at the front of the aisle has average number of customers of 83/hour and is determined to have high traffic.

For either FIG. 13 or FIG. 14, if the operator desires more information about any particular area or any particular area, a point-and-click interface allows the operator to navigate through representative still and video imagery of regions and/or activities that the system has detected and archived.

FIG. 15 illustrates another exemplary report for an aisle in a grocery store. The exemplary report includes an image from a video marked-up to include labels and trajectory indications and text describing the marked-up image. The system of the example is tasked with searching for a number of areas: length, position, and time of a trajectory of an object; time and location an object was immobile; correlation of trajectories with areas, as specified by the operator; and classification of an object as not a person, one person, two people, and three or more people.

The video image of FIG. 15 is from a time period where the trajectories were recorded. Of the three objects, two objects are each classified as one person, and one object is classified as not a person. Each object is assigned a label, namely Person ID 1032, Person ID 1033, and Object ID 32001. For Person ID 1032, the system determined the person spent 52 seconds in the area and 18 seconds at the position designated by the circle. For Person ID 1033, the system determined the person spent 1 minute and 8 seconds in the area and 12 seconds at the position designated by the circle. The trajectories for Person ID 1032 and Person ID 1033 are included in the marked-up image. For Object ID 32001, the system did not further analyze the object and indicated the position of the object with an X.

Referring back to block 22 in FIG. 2, calibration can be (1) manual, (2) semi-automatic using imagery from a video sensor or a video recorder, or (3) automatic using imagery from a video sensor or a video recorder. If imagery is required, it is assumed that the source video to be analyzed by the computer system 11 is from a video sensor that obtained the source video used for calibration.

For manual calibration, the operator provides to the computer system 11 the orientation and internal parameters for each of the video sensors 14 and the placement of each video sensor 14 with respect to the location. The computer system 11 can optionally maintain a map of the location, and the placement of the video sensors 14 can be indicated on the map. The map can be a two-dimensional or a three-dimensional representation of the environment. In addition, the manual calibration provides the system with sufficient information to determine the approximate size and relative position of an object.

Alternatively, for manual calibration, the operator can mark up a video image from the sensor with a graphic representing the appearance of a known-sized object, such as a person. If the operator can mark up an image in at least two different locations, the system can infer approximate camera calibration information.

For semi-automatic and automatic calibration, no knowledge of the camera parameters or scene geometry is required. From semi-automatic and automatic calibration, a lookup table is generated to approximate the size of an object at various areas in the scene, or the internal and external camera calibration parameters of the camera are inferred.

For semi-automatic calibration, the video surveillance system is calibrated using a video source combined with input from the operator. A single person is placed in the field of view of the video sensor to be semi-automatic calibrated. The computer system 11 receives source video regarding the single person and automatically infers the size of person based on this data. As the number of locations in the field of view of the video sensor that the person is viewed is increased, and as the period of time that the person is viewed in the field of view of the video sensor is increased, the accuracy of the semi-automatic calibration is increased.

Figure 7:
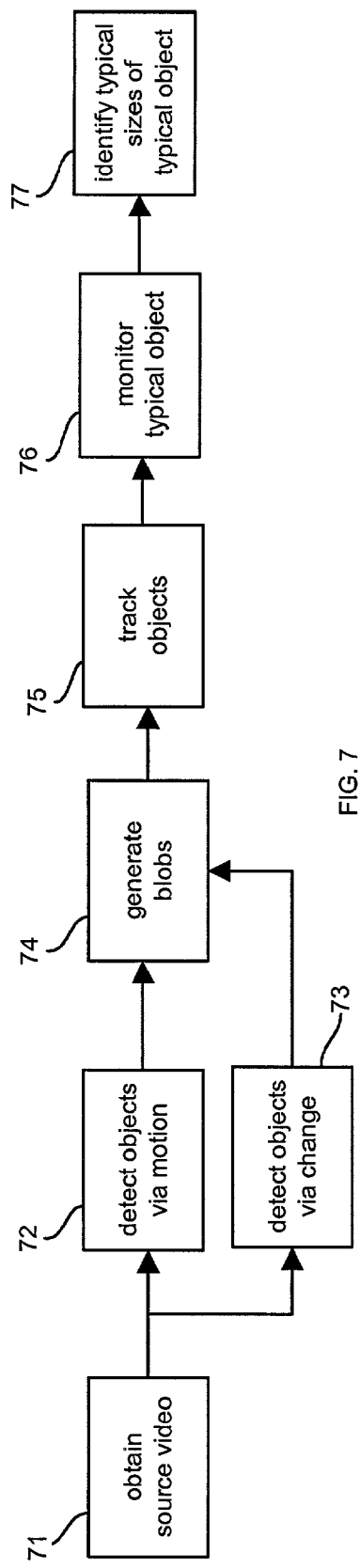
FIG. 7 illustrates a flow diagram for semi-automatic calibration of the video surveillance system.

FIG. 7 illustrates a flow diagram for semi-automatic calibration of the video surveillance system. Block 71 is the same as block 41, except that a typical object moves through the scene at various trajectories. The typical object can have various velocities and be stationary at various positions. For example, the typical object moves as close to the video sensor as possible and then moves as far away from the video sensor as possible. This motion by the typical object can be repeated as necessary.

Blocks 72-25 are the same as blocks 51-54, respectively.

In block 76, the typical object is monitored throughout the scene. It is assumed that the only (or at least the most) stable object being tracked is the calibration object in the scene (i.e., the typical object moving through the scene). The size of the stable object is collected for every point in the scene at which it is observed, and this information is used to generate calibration information.

Figure 11:
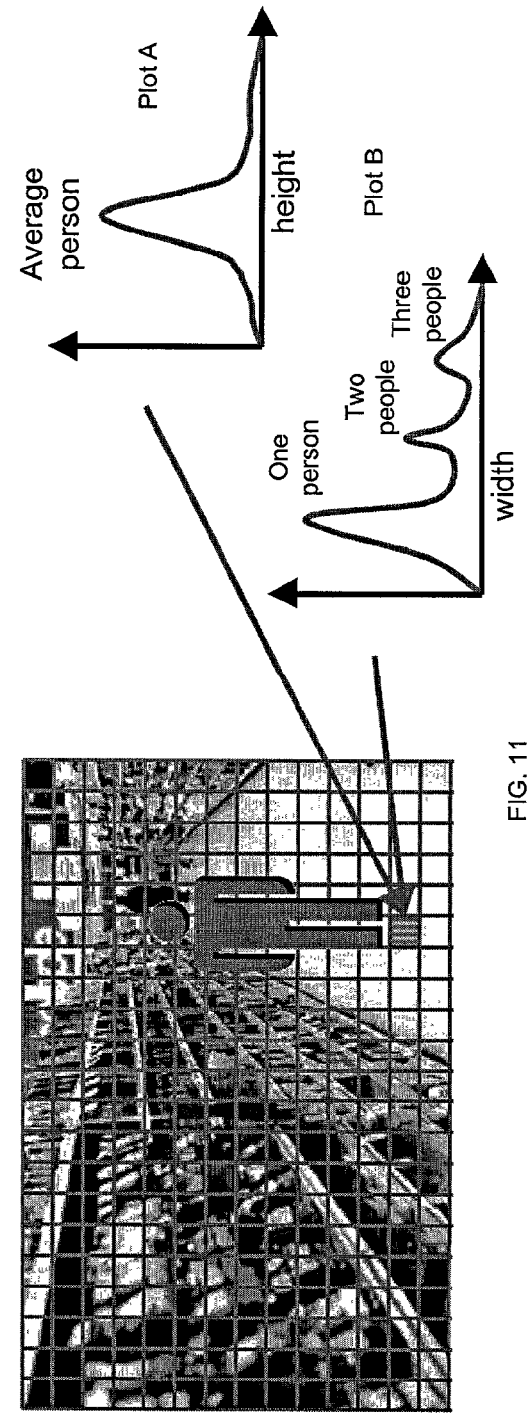

In block 77, the size of the typical object is identified for different areas throughout the scene. The size of the typical object is used to determine the approximate sizes of similar objects at various areas in the scene. With this information, a lookup table is generated matching typical apparent sizes of the typical object in various areas in the image, or internal and external camera calibration parameters are inferred. As a sample output, a display of stick-sized figures in various areas of the image indicate what the system determined as an appropriate height. Such a stick-sized figure is illustrated in FIG. 11.

For automatic calibration, a learning phase is conducted where the computer system 11 determines information regarding the location in the field of view of each video sensor. During automatic calibration, the computer system 11 receives source video of the location for a representative period of time (e.g., minutes, hours or days) that is sufficient to obtain a statistically significant sampling of objects typical to the scene and thus infer typical apparent sizes and locations.

Figure 8:
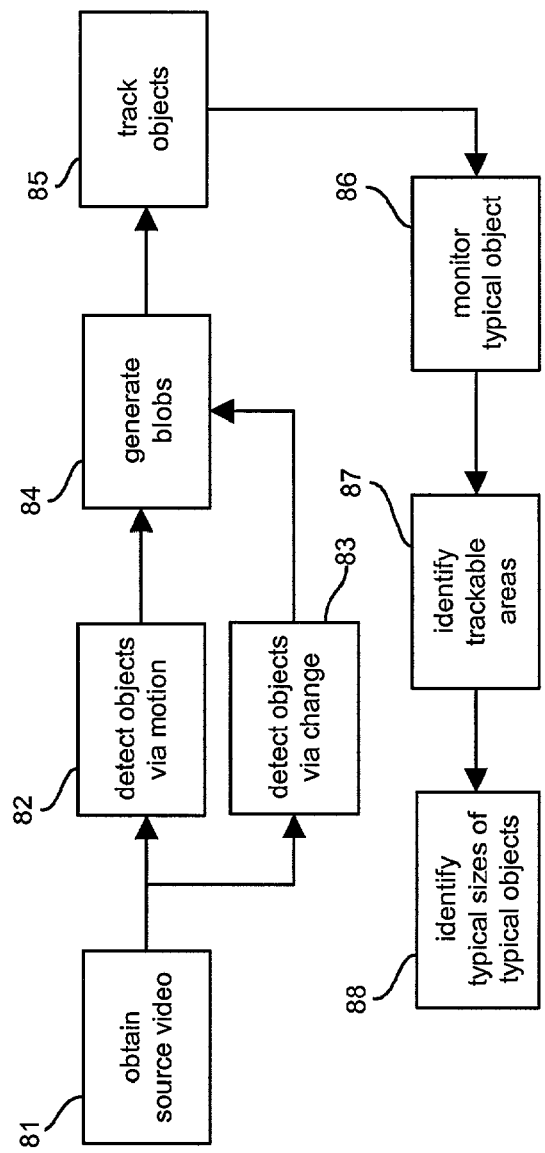
FIG. 8 illustrates a flow diagram for automatic calibration of the video surveillance system.

FIG. 8 illustrates a flow diagram for automatic calibration of the video surveillance system. Blocks 81-86 are the same as blocks 71-76 in FIG. 7.

In block 87, trackable regions in the field of view of the video sensor are identified. A trackable region refers to a region in the field of view of a video sensor where an object can be easily and/or accurately tracked. An untrackable region refers to a region in the field of view of a video sensor where an object is not easily and/or accurately tracked and/or is difficult to track. An untrackable region can be referred to as being an unstable or insalient region. An object may be difficult to track because the object is too small (e.g., smaller than a predetermined threshold), appear for too short of time (e.g., less than a predetermined threshold), or exhibit motion that is not salient (e.g., not purposeful). A trackable region can be identified using, for example, the techniques described in {13}.

Figure 10:
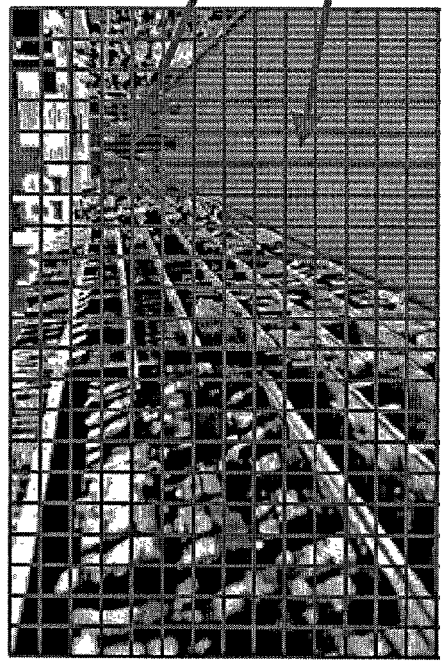
FIGS. 10-15 illustrate examples of the video surveillance system of the invention applied to monitoring a grocery store.

FIG. 10 illustrates trackable regions determined for an aisle in a grocery store. The area at the far end of the aisle is determined to be insalient because too many confusers appear in this area. A confuser refers to something in a video that confuses a tracking scheme. Examples of a confuser include: leaves blowing; rain; a partially occluded object; and an object that appears for too short of time to be tracked accurately. In contrast, the area at the near end of the aisle is determined to be salient because good tracks are determined for this area.

In block 88, the sizes of the objects are identified for different areas throughout the scene. The sizes of the objects are used to determine the approximate sizes of similar objects at various areas in the scene. A technique, such as using a histogram or a statistical median, is used to determine the typical apparent height and width of objects as a function of location in the scene. In one part of the image of the scene, typical objects can have a typical apparent height and width. With this information, a lookup table is generated matching typical apparent sizes of objects in various areas in the image, or the internal and external camera calibration parameters can be inferred.

FIG. 11 illustrates identifying typical sizes for typical objects in the aisle of the grocery store from FIG. 10. Typical objects are assumed to be people and are identified by a label accordingly. Typical sizes of people are determined through plots of the average height and average width for the people detected in the salient region. In the example, plot A is determined for the average height of an average person, and plot B is determined for the average width for one person, two people, and three people.

For plot A, the x-axis depicts the height of the blob in pixels, and the y-axis depicts the number of instances of a particular height, as identified on the x-axis, that occur. The peak of the line for plot A corresponds to the most common height of blobs in the designated region in the scene and, for this example, the peak corresponds to the average height of a person standing in the designated region.

Assuming people travel in loosely knit groups, a similar graph to plot A is generated for width as plot B. For plot B, the x-axis depicts the width of the blobs in pixels, and the y-axis depicts the number of instances of a particular width, as identified on the x-axis, that occur. The peaks of the line for plot B correspond to the average width of a number of blobs. Assuming most groups contain only one person, the largest peak corresponds to the most common width, which corresponds to the average width of a single person in the designated region. Similarly, the second largest peak corresponds to the average width of two people in the designated region, and the third largest peak corresponds to the average width of three people in the designated region.

Figure 9:
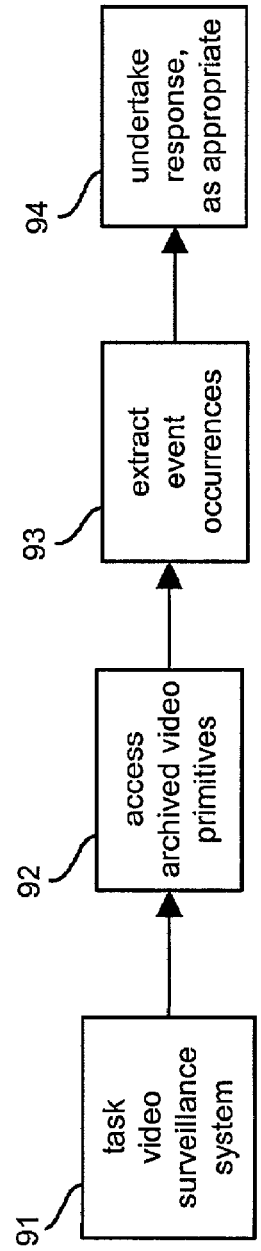
FIG. 9 illustrates an additional flow diagram for the video surveillance system of the invention.

FIG. 9 illustrates an additional flow diagram for the video surveillance system of the invention. In this additional embodiment, the system analyses archived video primitives with event discriminators to generate additional reports, for example, without needing to review the entire source video. Anytime after a video source has been processed according to the invention, video primitives for the source video are archived in block 43 of FIG. 4. The video content can be reanalyzed with the additional embodiment in a relatively short time because only the video primitives are reviewed and because the video source is not reprocessed. This provides a great efficiency improvement over current state-of-the-art systems because processing video imagery data is extremely computationally expensive, whereas analyzing the small-sized video primitives abstracted from the video is extremely computationally cheap. As an example, the following event discriminator can be generated: "The number of people stopping for more than 10 minutes in area A in the last two months." With the additional embodiment, the last two months of source video does not need to be reviewed. Instead, only the video primitives from the last two months need to be reviewed, which is a significantly more efficient process.

Block 91 is the same as block 23 in FIG. 2.

In block 92, archived video primitives are accessed. The video primitives are archived in block 43 of FIG. 4.

Blocks 93 and 94 are the same as blocks 44 and 45 in FIG. 4.

As an exemplary application, the invention can be used to analyze retail market space by measuring the efficacy of a retail display. Large sums of money are injected into retail displays in an effort to be as eye-catching as possible to promote sales of both the items on display and subsidiary items. The video surveillance system of the invention can be configured to measure the effectiveness of these retail displays.

For this exemplary application, the video surveillance system is set up by orienting the field of view of a video sensor towards the space around the desired retail display. During tasking, the operator selects an area representing the space around the desired retail display. As a discriminator, the operator defines that he or she wishes to monitor people-sized objects that enter the area and either exhibit a measurable reduction in velocity or stop for an appreciable amount of time.

After operating for some period of time, the video surveillance system can provide reports for market analysis. The reports can include: the number of people who slowed down around the retail display; the number of people who stopped at the retail display; the breakdown of people who were interested in the retail display as a function of time, such as how many were interested on weekends and how many were interested in evenings; and video snapshots of the people who showed interest in the retail display. The market research information obtained from the video surveillance system can be combined with sales information from the store and customer records from the store to improve the analysts understanding of the efficacy of the retail display.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method comprising:
   detecting an object in a video from a single camera;
   detecting a plurality of attributes of the object by analyzing the video from said single camera, the plurality of attributes including at least one of a physical attribute and a temporal attribute, each attribute representing a characteristic of the detected object;
   selecting a new user rule after detecting the plurality of attributes; and
   after detecting the plurality of attributes and after selecting the new user rule, identifying an event of the object that is not one of the detected attributes of the object by applying the new user rule to the plurality of detected attributes;
   wherein the plurality of attributes that are detected are independent of which event is identified,
   wherein the step of identifying the event of the object identifies the event without reprocessing the video, and
   wherein the event of the object refers to the object engaged in an activity.

2. The method of claim 1, wherein selecting the new user rule comprises selecting a subset of the plurality of attributes for analysis.

3. The method of claim 1, wherein the plurality of attributes that are detected are defined in a device prior to a selection of a subset of the plurality of attributes.

4. The method of claim 1, wherein no analysis is performed on at least some of the detected attributes to detect an event.

5. The method of claim 1, wherein the plurality of attributes include plural physical attributes and the method comprises applying the new user rule to a plural number of physical attributes.

6. The method of claim 1, wherein the plurality of attributes include plural temporal attributes and the method comprises applying the new user rule to a plural number of temporal attributes.

7. The method of claim 1, further comprising:
   storing the detected attributes in memory; and
   identifying the event of the object by analyzing only a subset of the attributes stored in the memory.

8. A method comprising:
   detecting first and second objects in a video from a single camera;
   detecting a plurality of attributes of each of the detected first and second objects by analyzing the video from said single camera, each attribute representing a characteristic of the respective detected object;
   selecting a new user rule; and
   after detecting the plurality of attributes, identifying an event that is not one of the detected attributes of the first and second objects by applying the new user rule to the plurality of detected attributes;
   wherein the plurality of attributes that are detected are independent of which event is identified,
   wherein the step of identifying an event of the object comprises identifying a first event of the first object interacting with the second object by analyzing the detected attributes of the first and second objects, the first event not being one of the detected attributes, and
   wherein the event of the object refers to the object engaged in an activity.

9. A video device comprising:
   means for detecting an object in a video from a single camera;
   means for detecting a plurality of attributes of the object by analyzing the video from said single camera, the plurality of attributes including at least a physical attribute and a temporal attribute, each attribute representing a characteristic of the detected object;
   a memory storing the plurality of detected attributes;
   means for selecting a new user rule after the plurality of detected attributes are stored in memory; and
   means for identifying an event of the object that is not one of the detected attributes of the object by applying a selected new user rule to the plurality of attributes stored in memory, for identifying the event independent of when the attributes are stored in memory and for identifying the event without reprocessing the video, and wherein the event of the object refers to the object engaged in an activity.

10. The video device of claim 9, further comprising:
a video camera operable to obtain the video.

11. The video device of claim 9, wherein the means for identifying an event of the object comprises means for identifying a first event of the object in real time by analyzing, of the plurality of attributes, only a first selected subset of the plurality of attributes.

12. The video device of claim 11, wherein the means for identifying an event of the object comprises means for identifying a second event of the object by analyzing, of the plurality of attributes, only a second selected subset of the plurality of attributes that have been archived.

13. The video device of claim 9, wherein applying a selected new user rule comprises analyzing, of the plurality of attributes, only a selected subset of the plurality of attributes.

14. The video device of claim 9,
wherein the memory is configured to store at least some of the plurality of attributes for at least two months, and
wherein the means for identifying an event of the object includes means for identifying an event of the object by analyzing only a selected subset of the plurality of attributes including the at least some of the plurality of attributes stored for at least two months.

15. The video device of claim 9, wherein the means for identifying an event includes means for identifying the event by analyzing at least two selected physical attributes of the plurality of attributes.

16. The video device of claim 9, wherein the identifying means identifies an event by analyzing a selection of individual ones of the detected plural attributes.

17. The video device of claim 9, wherein the plural attributes detected by the means for detecting are defined in the video device independent of a selection of the detected plural attributes.

18. The video device of claim 9, wherein the video surveillance device is a computer system configured as a video surveillance device.

19. The video device of claim 9, further comprising video sensors.

20. A method comprising:
providing a video device which detects an object upon analyzing a video from a single camera and which detects plural attributes of the detected object upon analyzing the video from said single camera, the plurality of attributes including at least a physical attribute and a temporal attribute; and
then, selecting a rule, which is not a rule used to detect any individual attribute, as a new user rule, the new user rule providing an analysis of a combination of the attributes to detect an event that is not one of the detected attributes,
wherein the attributes to be detected are independent of the event to be detected, and
wherein the event of the object refers to the object engaged in an activity.

21. The method of claim 20, further comprising:
providing a video device which detects an object upon analyzing a video and which detects plural physical attributes and plural temporal attributes of the detected object upon analyzing the video; and
then, selecting the new user rule to provide an analysis of a combination of the plural physical attributes and the plural temporal attributes to detect the event.

22. A non-transitory computer-readable storage medium containing instructions that when executed by a computer system cause said computer system to implement the following method comprising:
detecting an object in a video from a single camera;
detecting a plurality of attributes of the object by analyzing the video from said single camera, the plurality of attributes including at least one of a physical attribute and a temporal attribute, each attribute representing a characteristic of the detected object;
selecting a new user rule after detecting the plurality of attributes; and
after detecting the plurality of attributes and after selecting the new user rule, identifying an event of the object that is not one of the detected attributes of the object by applying the new user rule to the plurality of detected attributes, the event of the object being identified without reprocessing the video;
wherein the plurality of attributes that are detected are independent of which event is identified, and
wherein the event of the object refers to the object engaged in an activity.

23. The non-transitory computer-readable storage medium of claim 22, wherein selecting the new user rule comprises selecting a subset of the plurality of attributes for analysis.

24. The non-transitory computer-readable storage medium of claim 22, wherein the plurality of attributes that are detected are defined in a device prior to a selection of a subset of the plurality of attributes.

25. The non-transitory computer-readable storage medium of claim 22, wherein the instructions executed by the computer system do not cause the computer system to perform an analysis on at least some of the detected attributes to detect an event.

26. The non-transitory computer-readable storage medium of claim 22,
wherein the plurality of attributes include plural physical attributes, and
wherein the method implemented by the computer system further comprises applying the new user rule to a plural number of physical attributes.

27. The non-transitory computer-readable storage medium of claim 22,
wherein the plurality of attributes include plural temporal attributes, and
wherein the method implemented by the computer system further comprises applying the new user rule to a plural number of temporal attributes.

28. The non-transitory computer-readable storage medium of claim 22, wherein the method implemented by the computer system further comprises:
storing the detected attributes in memory; and
identifying the event of the object by analyzing only a subset of the attributes stored in the memory.

29. A non-transitory computer-readable storage medium containing instructions that when executed by a computer system cause said computer system to implement the following method comprising:
detecting first and second objects in a video from a single camera;
detecting a plurality of attributes of each of the detected first and second objects by analyzing the video from said single camera, each attribute representing a characteristic of the respective detected object;
selecting a new user rule; and
after detecting the plurality of attributes, identifying an event that is not one of the detected attributes of the first and second objects by applying the new user rule to the plurality of detected attributes;
wherein the plurality of attributes that are detected are independent of which event is identified,
wherein the step of identifying an event comprises identifying a first event of the first object interacting with the second object by analyzing the detected attributes of the first and second objects, the first event not being one of the detected attributes, and
wherein the event of the object refers to the object engaged in an activity.

30. A video device comprising:
means for detecting first and second objects in a video from a single camera;
means for detecting a plurality of attributes of the object by analyzing the video from said single camera, each attribute representing a characteristic of the respective detected object;
a memory storing the plurality of detected attributes; and
means for identifying an event of the first object interacting with the second object by applying a selected new user rule to the plurality of attributes stored in memory, and for identifying the event independent of when the attributes are stored in memory, the event not being one of the detected attributes,
wherein the event of the object refers to the object engaged in an activity.

31. The video device of claim 30, further comprising:
a video camera operable to obtain the video.

32. The video device of claim 30, wherein the means for identifying an event of the first object interacting with the second object comprises means for identifying a first event in real time by analyzing, of the plurality of attributes, only a first selected subset of the plurality of attributes.

33. The video device of claim 32, wherein the means for identifying an event of the first object interacting with the second object comprises means for identifying a second event by analyzing, of the plurality of attributes, only a second selected subset of the plurality of attributes which have been archived.

34. The video device of claim 30, wherein applying a selected new user rule comprises analyzing, of the plurality of attributes, only a selected subset of the plurality of attributes.

35. The video device of claim 30,
wherein the memory is configured to store at least some of the plurality of attributes for at least two months, and
wherein the means for identifying an event of the first object interacting with the second object includes means for identifying the event by analyzing only a selected subset of the plurality of attributes including the at least some of the plurality of attributes stored for at least two months.

36. The video device of claim 30, wherein the means for identifying an event includes means for identifying the event without reprocessing the video.

37. The video device of claim 30, wherein the means for identifying an event includes means for identifying the event by analyzing at least two selected physical attributes of the plurality of attributes.

38. The video device of claim 30, wherein the identifying means identifies an event by analyzing a selection of individual ones of the detected plural attributes.

39. The video device of claim 30, wherein the plural attributes detected by the means for detecting are defined in the video device independent of a selection of the detected plural attributes.

40. The video device of claim 30, wherein the video surveillance device is a computer system configured as a video surveillance device.

41. The video device of claim 30, further comprising video sensors.

* * * * *

(12) EX PARTE REEXAMINATION CERTIFICATE (10174th)
United States Patent
Lipton et al.

(10) Number: US 7,932,923 C1
(45) Certificate Issued: May 21, 2014

(54) VIDEO SURVEILLANCE SYSTEM EMPLOYING VIDEO PRIMITIVES

(75) Inventors: Alan J. Lipton, Falls Church, VA (US); Thomas M. Strat, Pakton, VA (US); Pèter L. Venetlaner, McLean, VA (US); Mark C. Allmen, Morrison, CO (US); William E. Severson, Littleton, CO (US); Niels Haering, Arlington, VA (US); Andrew J. Chosak, McLean, VA (US); Zhong Zhang, Herndon, VA (US); Matthew F. Frazier, Arlington, VA (US); James S. Seekas, Arlington, VA (US); Tasuki Hirata, Silver Spring, MD (US); John Clark, Leesburg, VA (US)

(73) Assignee: Diamondback Vision, Inc., Reston, VA (US)

Reexamination Request:
No. 90/012,876, May 23, 2013

Reexamination Certificate for:
Patent No.: 7,932,923
Issued: Apr. 26, 2011
Appl. No.: 12/569,116
Filed: Sep. 29, 2009

Related U.S. Application Data

(63) Continuation of application No. 09/987,707, filed on Nov. 15, 2001, now abandoned, which is a continuation-in-part of application No. 09/694,712, filed on Oct. 24, 2000, now Pat. No. 6,954,498.

(51) Int. Cl.
*H04N 7/18* (2006.01)

(52) U.S. Cl.
USPC .......................................................... 348/143

(58) Field of Classification Search
None
See application file for complete search history.

(56) References Cited

To view the complete listing of prior art documents cited during the proceeding for Reexamination Control Number 90/012,876, please refer to the USPTO's public Patent Application Information Retrieval (PAIR) system under the Display References tab.

*Primary Examiner* — Adam L Basehoar

(57) ABSTRACT

A video surveillance system is set up, calibrated, tasked, and operated. The system extracts video primitives and extracts event occurrences from the video primitives using event discriminators. The system can undertake a response, such as an alarm, based on extracted event occurrences.

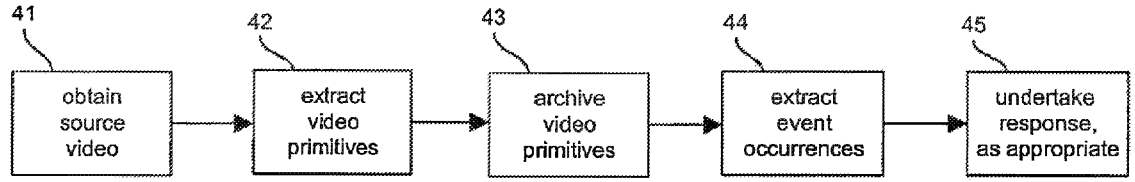

US 7,932,923 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 8-12:

This application claims the priority to *and is a continuation of* U.S. patent application Ser. No. 09/987,707, filed Nov. 15, 2001 *now abandoned*, which claims priority to *and is a continuation-in-part of* U.S. patent application Ser. No. 09/694,712, *filed on Oct. 24, 2000*, now U.S. Pat. No. 6,954,498, each of which is incorporated herein by reference in their entirety.

AS A RESULT OF REEXAMINATION, IT HAS BEEN DETERMINED THAT:

Claims 1, 8, 9, 20, 22, 29 and 30 are determined to be patentable as amended.

Claims 2-7, 10-19, 21, 23-28 and 31-41, dependent on an amended claim, are determined to be patentable.

1. A method comprising:
   detecting an object in a video from a single camera;
   detecting a plurality of attributes of the object by analyzing the video from said single camera, the plurality of attributes including at least one of a physical attribute and a temporal attribute, each attribute representing a characteristic of the detected object;
   selecting a new user rule after detecting the plurality of attributes; and
   after detecting the plurality of attributes and after selecting the new user rule, identifying an event of the object that is not one of the detected attributes of the object by applying the new user rule to the plurality of detected attributes, *wherein the applying the new user rule to the plurality of detected attributes comprises applying the new user rule to only the plurality of detected attributes*;
   wherein the plurality of attributes that are detected are independent of which event is identified,
   wherein the step of identifying the event of the object identifies the event without reprocessing the video, and
   wherein the event of the object refers to the object engaged in an activity.

8. A method comprising:
   detecting first and second objects in a video from a single camera;
   detecting a plurality of attributes of each of the detected first and second objects by analyzing the video from said single camera, each attribute representing a characteristic of the respective detected object;
   selecting a new user rule; and
   after detecting the plurality of attributes, identifying an event that is not one of the detected attributes of the first and second objects by applying the new user rule to the plurality of detected attributes, *wherein the applying the new user rule to the plurality of detected attributes comprises applying the new user rule to only the plurality of detected attributes*;
   wherein the plurality of attributes that are detected are independent of which event is identified,
   wherein the step of identifying an event of the object comprises identifying a first event of the first object interacting with the second object by analyzing the detected attributes of the first and second objects, the first event not being one of the detected attributes, and
   wherein the event of the object refers to the object engaged in an activity.

9. A video device comprising:
   means for detecting an object in a video from a single camera;
   means for detecting a plurality of attributes of the object by analyzing the video from said single camera, the plurality of attributes including at least a physical attribute and a temporal attribute, each attribute representing a characteristic of the detected object;
   a memory storing the plurality of detected attributes;
   means for selecting a new user rule after the plurality of detected attributes are stored in memory; and
   means for identifying an event of the object that is not one of the detected attributes of the object by applying a selected new user rule to the plurality of attributes stored in memory, for identifying the event independent of when the attributes are stored in memory and for identifying the event without reprocessing the video, *wherein the applying the new user rule to the plurality of detected attributes comprises applying the new user rule to only the plurality of detected attributes*, and
   wherein the event of the object refers to the object engaged in an activity.

20. A method comprising:
    providing a video device which detects an object upon analyzing a video from a single camera and which detects plural attributes of the detected object upon analyzing the video from said single camera, the plurality of attributes including at least a physical attribute and a temporal attribute; and
    then, selecting a rule, which is not a rule used to detect any individual attribute, as a new user rule, the new user rule providing an analysis of a combination of the attributes to detect an event that is not one of the detected attributes, *wherein the analysis of the combination of the attributes to detect the event comprises analyzing only the combination of the attributes*,
    wherein the attributes to be detected are independent of the event to be detected, and
    wherein the event of the object refers to the object engaged in an activity.

22. A non-transitory computer-readable storage medium containing instructions that when executed by a computer system cause said computer system to implement the following method comprising:
    detecting an object in a video from a single camera;
    detecting a plurality of attributes of the object by analyzing the video from said single camera, the plurality of attributes including at least one of a physical attribute and a temporal attribute, each attribute representing a characteristic of the detected object;
    selecting a new user rule after detecting the plurality of attributes; and
    after detecting the plurality of attributes and after selecting the new user rule, identifying an event of the object that is not one of the detected attributes of the object by applying the new user rule to the plurality of detected attributes, the event of the object being identified without reprocessing the video, *wherein the applying the new user rule to the plurality of detected attributes comprises applying the new user rule to only the plurality of detected attributes*;

wherein the plurality of attributes that are detected are independent of which event is identified, and wherein the event of the object refers to the object engaged in an activity.

29. A non-transitory computer-readable storage medium containing instructions that when executed by a computer system cause said computer system to implement the following method comprising:

detecting first and second objects in a video from a single camera;

detecting a plurality of attributes of each of the detected first and second objects by analyzing the video from said single camera, each attribute representing a characteristic of the respective detected object;

selecting a new user rule; and after detecting the plurality of attributes, identifying an event that is not one of the detected attributes of the first and second objects by applying the new user rule to the plurality of detected attributes, *wherein the applying the new user rule to the plurality of detected attributes comprises applying the new user rule to only the plurality of detected attributes*;

wherein the plurality of attributes that are detected are independent of which event is identified, wherein the step of identifying an event comprises identifying a first event of the first object interacting with the second object by analyzing the detected attributes of the first and second objects, the first event not being one of the detected attributes, and wherein the event of the object refers to the object engaged in an activity.

30. A video device comprising:

means for detecting first and second objects in a video from a single camera;

means for detecting a plurality of attributes of the object by analyzing the video from said single camera, each attribute representing a characteristic of the respective detected object;

a memory storing the plurality of detected attributes; and means for identifying an event of the first object interacting with the second object by applying a selected new user rule to the plurality of attributes stored in memory, and for identifying the event independent of when the attributes are stored in memory, the event not being one of the detected attributes,

*wherein the applying the selected new user rule to the plurality of attributes stored in memory comprises applying the selected new user rule to only the plurality of attributes stored in memory,* wherein the event of the object refers to the object engaged in an activity.

\* \* \* \* \*